US010880034B2

(12) United States Patent
Ferreira Pedro (10) Patent No.: US 10,880,034 B2
(45) Date of Patent: Dec. 29, 2020

(54) METHOD, COMPUTER PROGRAM AND ROUTING ENGINE FOR PROACTIVE PERFORMANCE-BASED FREQUENCY MANAGEMENT

(71) Applicant: Xieon Networks S.à.r.l., Luxembourg (LU)

(72) Inventor: João Manuel Ferreira Pedro, Lisbon (PT)

(73) Assignee: XIEON NETWORKS S.a.r.l., Luxembourg (LU)

( * ) Notice: Subject to any disclaimer, the term of this patent is extended or adjusted under 35 U.S.C. 154(b) by 0 days.

(21) Appl. No.: 16/096,201

(22) PCT Filed: Sep. 21, 2017

(86) PCT No.: PCT/EP2017/073918
§ 371 (c)(1),
(2) Date: Oct. 24, 2018

(87) PCT Pub. No.: WO2018/055042
PCT Pub. Date: Mar. 29, 2018

(65) Prior Publication Data
US 2019/0207701 A1 Jul. 4, 2019

(30) Foreign Application Priority Data
Sep. 21, 2016 (EP) .................................. 16189989

(51) Int. Cl.
*H04J 14/02* (2006.01)
*H04Q 11/00* (2006.01)

(52) U.S. Cl.
CPC ...... *H04J 14/0257* (2013.01); *H04J 14/0271* (2013.01); *H04J 14/0241* (2013.01);
(Continued)

(58) Field of Classification Search
CPC .............. H04J 14/0257; H04J 14/0271; H04J 14/0221; H04J 14/0241; H04J 14/0246; H04J 14/0227
(Continued)

(56) References Cited
U.S. PATENT DOCUMENTS 6,304,349 B1 * 10/2001 Alanyali ............. H04J 14/0227
398/9
6,535,313 B1 * 3/2003 Fatehi ................. H04J 14/0227
398/101
(Continued)

FOREIGN PATENT DOCUMENTS
EP 1 303 160 A2 4/2003

OTHER PUBLICATIONS

Chaves, D. et al., "Fast and adaptive impairment aware routing and wavelength assignment algorithm optimized by offline simulations," Optical Switching and Networking, vol. 7(3):127-138 (2010).
(Continued)

*Primary Examiner* — Abbas H Alagheband (57) ABSTRACT

Disclosed herein is a method of assigning a wavelength to a given light path in a wavelength switched optical network, as well as a corresponding routing engine and computer program. The method comprises the following step. For each of a plurality of possible wavelengths for said light path, retrieving information from an optical performance database (30) allowing to assess whether the given wavelength meets a predetermined feasibility criterion with regard to said given light path; if the given wavelength is found to meet the predetermined feasibility criterion, determining a set of extended feasible light paths, each of which fully including the given light path, but containing one or more additional nodes; and calculating a first score based on said determined set of extended feasible light paths, wherein said method further comprises a step of choosing, based on
(Continued)

said first score, a wavelength that has a first score indicating a low suitability for providing useful extended feasible light paths for future use.

11 Claims, 7 Drawing Sheets

(52) U.S. Cl.
CPC .............. *H04Q 2011/0073* (2013.01); *H04Q 2011/0086* (2013.01)

(58) Field of Classification Search
USPC ............................................. 398/79, 58, 59
See application file for complete search history.

(56) References Cited

U.S. PATENT DOCUMENTS

| | | | | |
|---|---|---|---|---|
| 6,956,868 | B2* | 10/2005 | Qiao | H04Q 11/0005 370/466 |
| 7,362,974 | B2* | 4/2008 | De Patre | H04J 14/0294 398/50 |
| 8,571,415 | B1 | 10/2013 | Rider et al. | |
| 8,644,703 | B2* | 2/2014 | Mukherjee | H04J 14/0257 398/5 |
| 10,050,740 | B2* | 8/2018 | Zhang | H04J 14/0212 |
| 10,097,901 | B2* | 10/2018 | Stafford | H04L 12/2801 |
| 2001/0050790 | A1* | 12/2001 | Graves | H04J 14/0295 398/45 |
| 2002/0109879 | A1* | 8/2002 | Wing So | H04J 14/0241 398/58 |
| 2002/0191250 | A1* | 12/2002 | Graves | H04Q 11/0066 398/82 |
| 2003/0016414 | A1* | 1/2003 | Solheim | H04J 14/0283 398/82 |
| 2003/0198227 | A1* | 10/2003 | Matsuura | H04J 14/0246 370/395.2 |
| 2004/0032831 | A1* | 2/2004 | Matthews | H04L 45/12 370/238 |
| 2004/0208504 | A1* | 10/2004 | Solheim | H04J 14/0227 398/16 |
| 2011/0182576 | A1* | 7/2011 | Zhou | H04J 14/0241 398/34 |
| 2013/0302033 | A1* | 11/2013 | Sriram | H04J 14/0267 398/49 |
| 2014/0086570 | A1* | 3/2014 | Rider | H04J 14/0283 398/2 |
| 2015/0055953 | A1* | 2/2015 | Guy | H04J 14/0227 398/48 |
| 2017/0093518 | A1* | 3/2017 | Barnard | H04J 14/0201 |
| 2017/0104632 | A1* | 4/2017 | Kim | H04J 14/0217 |
| 2017/0118546 | A1* | 4/2017 | Lee | H04L 45/00 |
| 2018/0367214 | A1* | 12/2018 | Woodward | H04Q 11/0001 |

OTHER PUBLICATIONS

He, J. et al., "QoT-Aware Routing in Impairment-Constrained Optical Networks," Global Telecommunications Conference 2007, Globecom 2007, IEEE: 2269-2274.
International Search Report and Written Opinion, PCT/EP2017/073918, dated Nov. 2, 2017, 17 pages.
Manousakis, K. et al., "Offline Impairment-Aware Routing and Wavelength Assignment Algorithms in Translucent WDM Optical Networks," Journal of Lightwave Technology, IEEE, vol. 27(12):1866-1877 (2009).
Martinez, R. et al., "Experimental Translucent-Oriented Routing for Dynamic Lightpath Provisioning in GMPLS-Enabled Wavelength Switched Optical Networks," Journal of Lightwave Technology, vol. 28(8):1241-1255 (2010).
Zang H. et al., "A Review of Routing and Wavelength Assignment Approaches for Wavelength-Routed Optical WDM Networks," Optical Networks Magazine, vol. 1(1):47-60 (2000).

* cited by examiner

METHOD, COMPUTER PROGRAM AND ROUTING ENGINE FOR PROACTIVE PERFORMANCE-BASED FREQUENCY MANAGEMENT

RELATED APPLICATIONS

This application is a 35 U.S.C. 371 national stage filing of International Application No. PCT/EP2017/073918, filed on Sep. 21, 2017, which claims priority to European Patent Application No. 16189989.3, filed on Sep. 21, 2016. The entire contents of these applications are incorporated herein by reference in their entirety.

FIELD OF THE INVENTION

The present invention is in the field of planning and operating of optical networks. More particularly, the present invention relates to a method of assigning a wavelength to a given light path in a wavelength switched optical network.

BACKGROUND OF THE INVENTION

Dense wavelength division multiplexing (DWDM) networks comprise a set of multiplexing/de-multiplexing nodes, such as Reconfigurable Optical Add/Drop Multiplexers (ROADMs) which are interconnected by fiber links, which are also referred to as Optical Multiplexing Sections (OMSs) in the art. The network is capable of providing connectivity between two of its nodes in the form of a service set up between them.

When a service needs to be established in the DWDM network, a light path between the source and the destination nodes of the service needs to be computed. Between the source and destination nodes, the light path may have one or more intermediate nodes, which intermediate nodes may in particular be formed by ROADMs or other network elements, to thereby acquire the general form of: {source node, link 1, intermediate node 1, link 2, intermediate node 2, . . . , link H, destination node}, where H denotes the number of links traversed. The definition of a light path further includes specifying a wavelength used in every link of the light path. Within a light path as used in the present disclosure, an optical signal remains in the optical domain, and is hence not converted to the electrical domain underway.

As the optical signal, after being generated at the transmitter at the source node, traverses the various links and intermediate nodes of a light path, its quality degrades due to physical impairments. Hence, a light path is considered to be feasible if one or several optical performance metrics (e.g., Optical Signal to Noise Ratio, OSNR) is maintained within a given threshold (e.g., OSNR larger or equal to a given value), allowing the correct detection of the optical signal in the receiver at the destination node. The requirement of "correct detection" could for example amount to the Bit Error Rate, BER of a data signal transmitted over said light path lying below some predefined threshold. Otherwise, the light path is assumed to be unfeasible. In this case, 3R regeneration has to be provided at an intermediate node, that is, two light paths need to be set up with a 3R regenerator between them, instead of just one. "3R regeneration" is a process, in which an optical signal is converted back to the electrical domain, subjected to re-amplification, re-shaping and re-timing, and then converting the resulting electrical signal again to the optical domain. Hence, in general terms, a given number L of light paths may be needed between the source and destination node, depending on several factors, such as the length of the path between the source and destination nodes and the characteristics of the fiber links, of the amplifier devices located along the fiber links, of the nodes and of the transmitter/receiver technology to be used.

In the present disclosure, a path between a source node and a destination node including more than one light path, and with a 3R regenerator between adjacent light paths, is referred to as a "routing path". Note that if a 3R regenerator is used between two adjacent light paths, the same data signal can be transmitted using different wavelengths on the different light paths.

Based on the discussion above, each service created over the DWDM network can be broadly classified into one of two possible categories:

Transparent service: only one light path needs to be provisioned between the two end nodes (source and destination) of the service, in view of a relatively short distance between them. This is the case for the majority or even all of the services in a Metro/Regional network.

Translucent service: two or more light paths need to be provisioned between the two end nodes of the service, since it is not possible to transparently transmit the signal end-to-end given the extent of physical impairments affecting it. This is expected to be the case for a significant number of services in a Long-haul network.

A 3R regenerator is one of the most expensive devices deployed in DWDM transport networks. Therefore, during both tender planning and/or network operation of long-haul DWDM networks, minimizing the number of 3R regenerators utilized to set up services may be the most important optimization criteria: Establishing all the services with a minimum number of 3R regenerators enables to substantially reduce the capital expenditures (CAPEX).

Also, in order to create a service it is necessary to define the routing path of the service (i.e., end-to-end sequence of nodes and links), the number and location of the 3R regenerators (which define the set of light paths required) and the specific wavelengths to be allocated to each of the light paths. The effectiveness of this process influences the number of 3R regenerators that are required to establish the service and, as a result, the associated CAPEX.

DWDM transport networks exploit the spectrum in the C band. For instance, DWDM solutions based on 96 channels comprise optical channels whose central frequencies are between 191.35 THz and 196.10 THz (the corresponding central wavelengths of these channels being between 1566.72 nm and 1528.77 nm).

Figure 1:
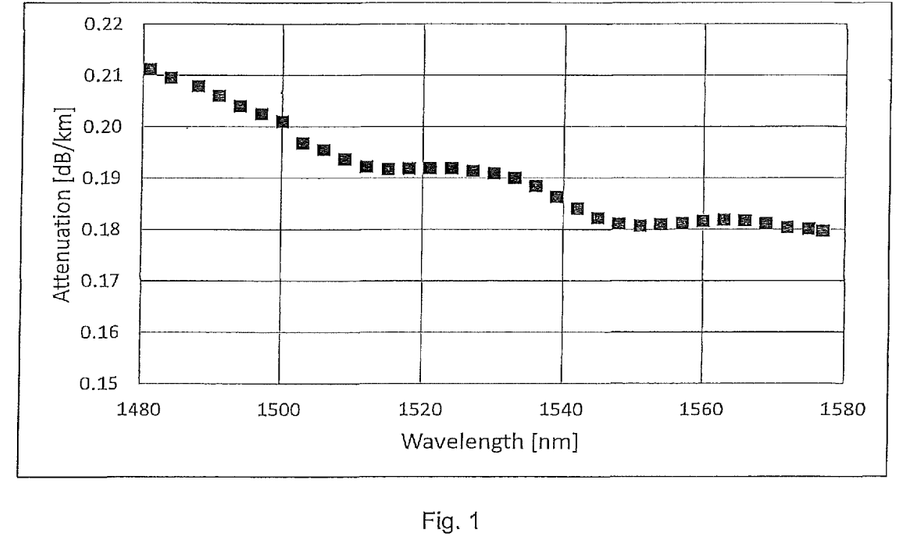
FIG. 1 is a diagram showing the wavelength dependent attenuation of optical signals in an optical fiber.
Figure 2:
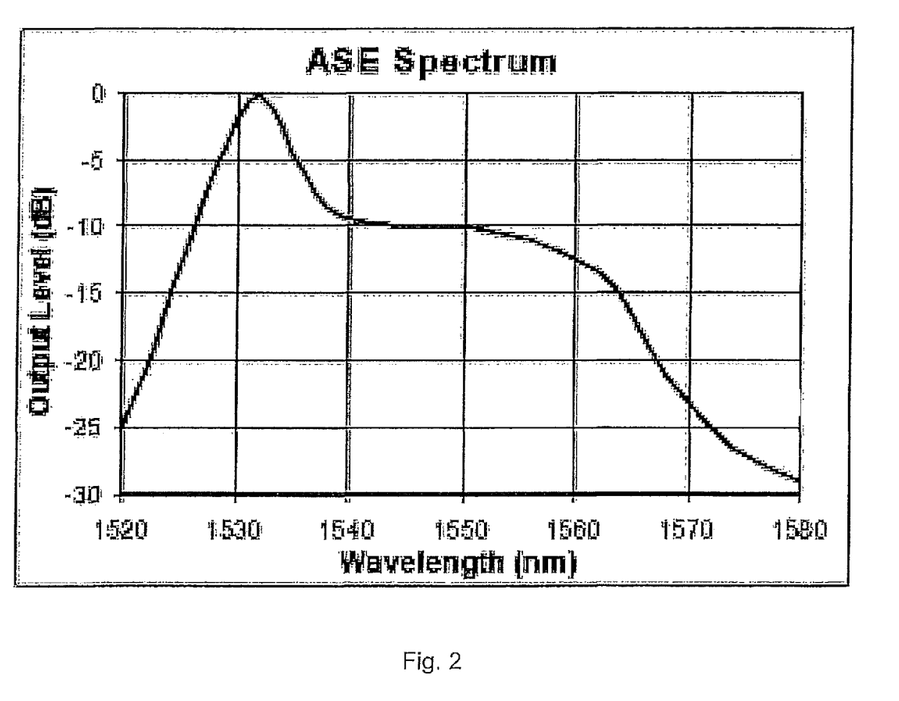
FIG. 2 is a diagram showing the wavelength dependency of amplified spontaneous emission noise in an optical fiber.

Importantly, due to the properties of the optical fiber used in the network, the extent of physical impairments is not the same across the entire C band. In order to exemplify this, the following two cases shall be considered. As shown in the measurements depicted in FIG. 1, the attenuation is not uniform across the C band. Moreover, the Amplified Spontaneous Emission (ASE) noise, added by optical amplifiers to the signal, is also dependent on the wavelength, as illustrated in FIG. 2. Overall, both the properties of the optical fiber and of the devices placed along the transmission path, as well as the specific design of the DWDM network (e.g., parameterization of input powers), result in having some wavelengths with better performance than others. When considering full optical paths, this potentially translates into differentiated maximum reach figures per frequency. As a result, in a long-haul DWDM network some of the longer light paths may be feasible only if they are realized using a frequency from a sub-set of frequencies of the C band, but they might not be feasible using the remaining frequencies of the C band.

In order to better understand and illustrate this effect, the present inventor has used the so-called TransNet planning tool developed by Coriant to generate all the feasible paths discriminated by frequency in several long-haul customer networks. The set of feasible paths was then processed to create histograms expressing the dependence of the total number of feasible light paths on frequency, as well as other statistics.

Figure 3:
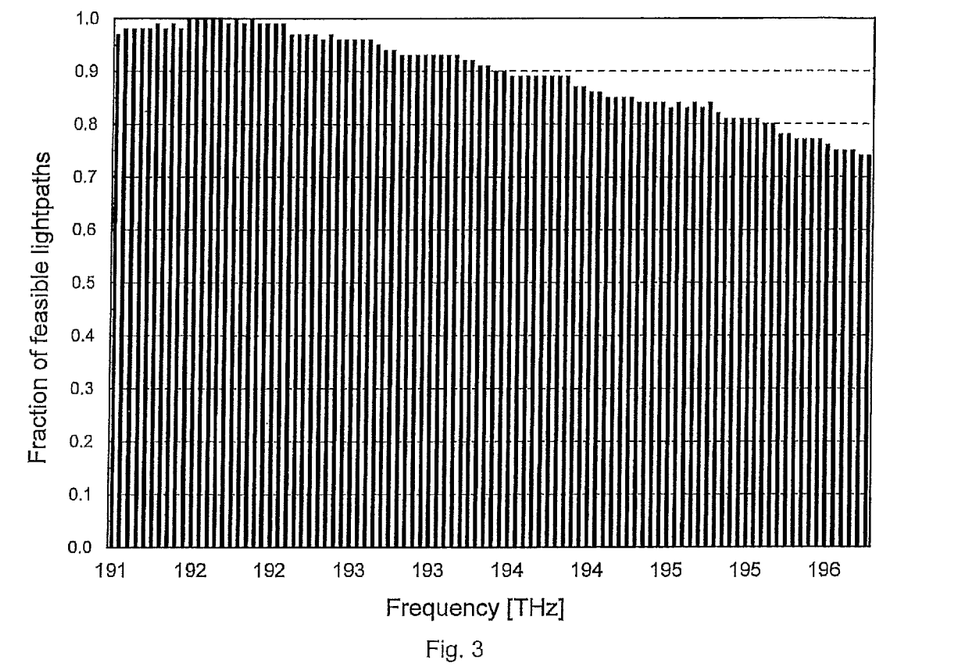
FIG. 3 is a diagram showing the fraction of feasible light paths as a function of the signal frequency in a small long-haul customer network.
Figure 4:
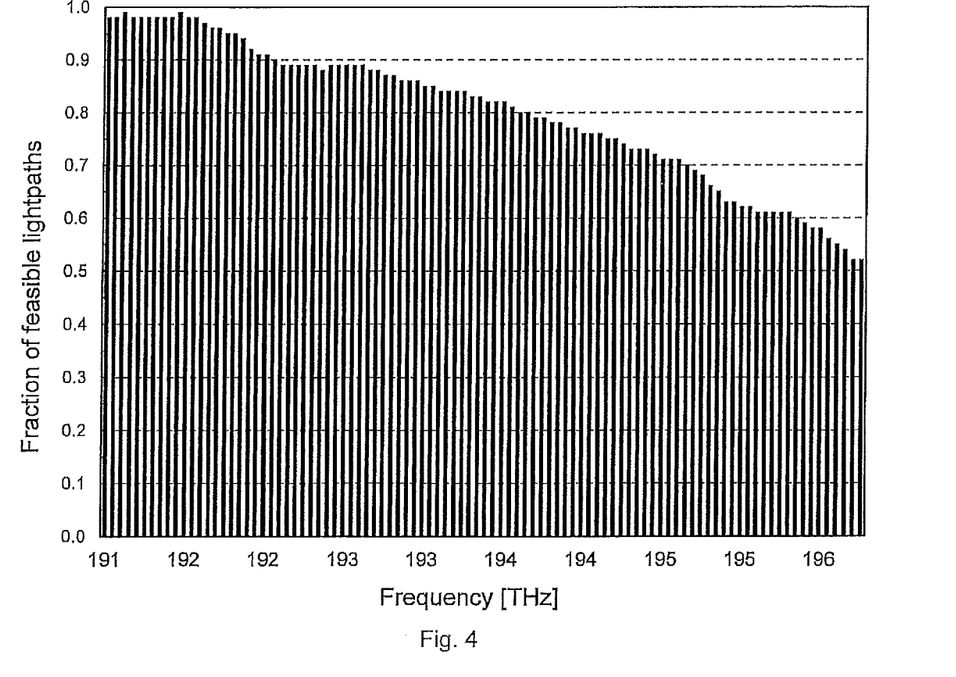
FIG. 4 is a diagram showing the fraction of feasible light paths as a function of the frequency in a large long-haul customer network.

FIG. 3 and FIG. 4 depict the fraction of feasible light paths per frequency for two of the long-haul networks, one small network (FIG. 3) and one large network (FIG. 4). The fraction of feasible light paths for each frequency is defined as the number of light paths which are feasible for that frequency divided by the total number of feasible light paths. In addition, the following Table I highlights the average and standard deviation of the fraction of feasible light paths (expressed in percentage).

TABLE I

Average and standard deviation of the fraction of feasible light paths per frequency.

| Example network | Average fraction of feasible light paths [%] | Standard deviation of the fraction of feasible light paths [%] |
| --- | --- | --- |
| Small network | 89.63 | 7.89 |
| Large network | 79.99 | 13.38 |

From observing these results, it becomes quite clear that optical performance (and consequently reach) varies substantially with frequency. Furthermore, this effect seems to become even more notorious in larger networks—for example, the worst frequencies in the larger network can only be used in roughly half of the feasible light paths. There is also a general trend to have better performance with lower frequencies (i.e. higher wavelengths) than with higher frequencies (lower wavelengths). However, this is only a trend and it cannot be assumed that lower frequencies always perform better. In fact, from the fraction of feasible light paths for the smaller long-haul network shown in FIG. 3 it can be seen that the best performance (in number of feasible light paths) is in fact attained with frequencies higher than the lowest ones. Finally, although not evident from the results shown, which only show overall figures, the inventor has also noticed in this analysis a spatial dependence involved, that is, certain frequencies may be more ill-suited in some parts of the DWDM network than in other parts of the same network.

Based on the discussion above and given the potential reach differences between frequencies, the inventor therefore conjectured that for some of the services being provisioned over the DWDM network, the best performing frequencies can enable using less 3R regenerators than the worst performing frequencies. Therefore, the inventor believes that having access to per frequency optical performance information can be the key to reduce the number of 3R regenerators deployed when implementing network planning and/or network operation.

Prior art methods of assigning wavelengths to a light path are typically based on defining a fixed order by which wavelengths are to be searched and assigning the first available one to a given light path. The same selection order is enforced throughout the network, that is, irrespective of the specific light path being considered. Prior art examples of this general strategy are as follows:

First Fit/Last Fit: starting from one side of the spectrum the first frequency/wavelength available in all links or OMSs of the light path is selected. The rationale of this method is to pack as much as possible the currently used frequencies in only one side of the spectrum, thus increasing the probability that at the opposite side of the spectrum some frequencies remain free in many links/OMSs, improving the chances of finding available ones for future light paths. An overview of this method is given in H. Zang, J. Jue and B. Mukherjee, "A Review of Routing and Wavelength Assignment Approaches for Wavelength-Routed Optical WDM Networks", Optical Networks Magazine, vol. 1, no. 1, pp. 47-60, January 2000.

Channel Plan: a predefined order by which available wavelengths are searched is defined based on some other criteria than preferably packing them on one side of the spectrum. This is for instance the case with Coriant's current TransNet planning tool which defines a fixed search order in such way that spectrum occupation will become scattered. This can be used for example to ensure that in links/OMSs with low occupation, the used frequencies are far apart from each other, which can be beneficial to, for example, mitigate any optical performance degradation effect of the signal in one frequency on its neighbors. However, as the links get increasingly loaded, the inability to pack frequencies implies that it may become increasingly difficult to find a frequency that is free in a sequence of links.

Another class of wavelength assignment methods uses an adaptive order by which frequencies are to be searched based on the current frequency occupation in the network. One of the main methods of this type is highlighted below. An overview is again given in the article by H. Zang cited above. A prior art example of this general strategy is the following:

Most Used: the number of links in which a frequency is already being used is computed (and designated as the frequency utilization ratio) and preference is given to selecting the frequency that is both available in all links of the light path and has the highest utilization ratio. The rationale is to reuse as much as possible the already in-use frequencies before allocating the less used ones, thus preserving the latter for future light paths.

US 2013/0330081 A1 suggests a method that incorporates frequency-dependent performance information, enabling to exploit better performing frequencies for longer light paths. The method involves estimating or measuring the typical reach of a frequency (over the entire network) and then placing the frequencies into a table or set of bins. These tables (bins) are then used to find a feasible frequency.

The previously described methods are proactive in nature. In the alternative, when a new light path needs to be provisioned and all feasible frequencies have been assigned to other light paths, the network can reactively try to reassign a different frequency to one of these light paths and release its frequency for usage by the new light path. However, this may entail disrupting the services provided by the existing light path while the reassignment takes place, which is typically not accepted by network operators.

SUMMARY OF THE INVENTION

A problem underlying the present invention to provide a method, a computer program and a routing engine allowing for proactively decreasing the number of 3R regenerators needed when establishing future services.

This problem is solved by methods according to claim 1 or 11, a computer program according to claim 16 as well as by a routing engine according to claim 18 or 19. Favorable further developments are defined in the dependent claims.

The present invention provides in a first aspect a method of assigning a wavelength to a given light path in a wavelength switched optical network, in particular a dense wavelength division multiplexing network, wherein said light path comprises at least two nodes and links between each two nodes. The method comprises the following steps:

For each of a plurality of possible wavelengths for said light path,
retrieving information from an optical performance database allowing to assess whether the given wavelength meets a predetermined feasibility criterion with regard to said given light path, wherein fulfillment of said feasibility criterion is indicative for the wavelength providing a predetermined optical performance level on said given light path,
if the given wavelength is found to meet the predetermined feasibility criterion, determining a set of extended feasible light paths, each of which fully including the given light path, but containing one or more additional nodes, and each of which likewise meeting the predetermined feasibility criterion, and
calculating a first score based on said determined set of extended feasible light paths, said first score indicating to what extent the given wavelength is suitable for providing useful extended feasible light paths for future use, wherein said method further comprises a step of choosing, based on said first score, a wavelength that has a first score indicating a low suitability for providing useful extended feasible light paths for future use.

According to the invention, for each of a plurality of possible wavelengths for the given light path, first information is retrieved from an optical performance database allowing to assess whether the given wavelength meets a predetermined feasibility criterion with regard to said given light path. Herein, the fulfillment of the feasibility criterion is indicative for the wavelength providing a predetermined optical performance level on said given light path. A typical example of such a performance level is e.g. the optical signal-to-noise ratio for the given frequency.

When the feasibility criterion is met, this means that the light path can be established with this frequency, without having to add a 3R regenerator. However, in the general case, there will be several wavelengths meeting the feasibility criterion, and the method of the invention allows for making a suitable choice that will also increase the chances that future services to be established can be realized without the need of employing additional 3R regenerators, or at least decreasing the number of additional 3R regenerators.

For this purpose, if the given wavelength is found to meet the predetermined feasibility criterion, a set of extended feasible light paths is determined. An "extended feasible light path" is a light path that fully includes the given light path, but contains one or more additional nodes, while still meeting the predetermined feasibility criterion. Based on the determined set of extended feasible light paths, a first score is calculated, which indicates to what extent the given wavelength is suitable for providing useful extended feasible light paths for future use.

Finally, the method comprises a step of choosing, based on said first score, a wavelength that has a first score indicating a low suitability for providing useful extended feasible light paths for future use. This way, the method proactively reserves the best or most useful wavelengths for future use. This in turn means that for future services, the use of a 3R regenerator can more likely be avoided even if an "extended feasible light path", or in other words, a longer and hence more demanding light path than the given light path is needed.

An important aspect of the method of the invention is that—by employing a score that is based on a set of extended feasible light paths—it takes into account local performance dependencies. This is markedly different from the method described in US 2013/0330081 A1, which is essentially a fixed order method, but where the order to go through the frequencies is built based on estimated or measured frequency performance, while the same order of search is enforced irrespective of the light path. This means that in this prior art, the process is only taking into account the global performance of the frequencies but not the local one, i.e. the performance over the given light path and its vicinity. As a result, the frequency selected for some light paths may not be the feasible one that has less impact on future light paths established over and in the vicinity of the current light path.

In a preferred embodiment, the first score is chosen to reflect one or more of the following criteria:
the total number of extended feasible light paths,
the total number of additional links traversed by the extended light paths,
the additional length traversed by all or a subset of extended light paths.

As the skilled person will appreciate, each of the above criteria indicates that the wavelength is suitable for providing useful extended feasible light paths for future use. For example, if a given frequency leads to a high total number of extended feasible light paths, this means that this frequency could be used for a large number of future light paths including the given light path, and the chances that one of these light paths will be needed for future use, for example when a future service is provisioned, is correspondingly high. And since each of these extended feasible light paths are feasible, this means that they can be employed without having to add a 3R regenerator, in spite of the fact that they are each longer than the given light path.

Also, the total number of additional links traversed by the extended light paths is indicative of the fact that the wavelength is suitable for providing useful extended feasible light paths for future use. A large number of additional links traversed by the set of extended light paths can again be due to a large total number of extended feasible light paths (since each extended feasible light path adds at least one link), but can alternatively or in addition be due to the fact that the average length of the extended feasible light paths is longer, or at least that the extended feasible light paths on average add a larger number of links as compared to the given light path, a fact that is not reflected in the first criterion. Clearly, longer feasible light paths, both with regard to the physical length in kilometers, but also with regard to number of links, are particularly valuable, because generally longer light paths and/or light path with higher link numbers will less likely be feasible, but will need the addition of a 3R regenerator instead.

Finally, the third criterion, which is based on the additional length traversed by all or by a subset of extended light paths is likewise indicative of the fact that the wavelength is suitable for providing useful extended feasible light paths for future use, namely longer light paths, which are more difficult to establish without 3R regeneration.

In a preferred embodiment, at least two of the following metrics are employed for calculating said first score:
- a first metric assigning the total number of extended feasible light paths to the given wavelength,
- a second metric assigning the total number of additional links traversed by the extended feasible light paths to the given wavelength,
- a third metric assigning the total additional length of all of the extended feasible light paths to the given wavelength, and
- a fourth metric assigning the total additional length of a subset of said extended feasible light paths to the given wavelength, wherein said subset is formed by the n longest light paths among said set of extended feasible light paths, where n is a predetermined integer≥1.

According to this embodiment, the aforementioned criteria are made quantitative by using a metric that assigns a number representing the criterion, and hence allows for easily calculating and comparing scores. Herein, said first score is a function of two or more of said first to fourth metrics, in particular a linear combination thereof.

In a preferred related embodiment, in said step of choosing a wavelength based on said first score, a wavelength with the lowest score is chosen.

Please note that while specific criteria and metrics are recited above that allow for classifying low or high suitability for providing useful extended feasible light paths for future use, other criteria and metrics are likewise possible, and the invention is not limited to any of them, as long as the assessment is based on the determining of sets of extended feasible light paths for a given light path, and in doing this for each of a plurality of possible wavelengths for said given light path.

In case there is a tie among first scores indicating a low suitability for providing useful extended feasible light paths for future use, preferably a wavelength is chosen based on a predefined order of wavelengths, or based on the optical performance level achieved for said wavelength determined for said given light path.

In a preferred embodiment, the method further comprises a step of retrieving, from a database, information about availability of wavelengths for said light path, and said plurality of possible wavelengths corresponds to a set of wavelengths that have been confirmed to be available.

As indicated above, in a preferred embodiment, said optical performance level corresponds to an optical signal-to-noise ratio.

In a preferred embodiment, the method is carried out by a routing engine for planning and/or operating a wavelength switched optical network, in particular a dense wavelength division multiplexing network.

In a preferred embodiment, the method further comprises a step of estimating optical performance data based on one or more of the following characteristics: length of a corresponding link, link loading, information regarding the fiber type employed in the link, launch power and dispersion information, and storing said estimated performance data in said optical performance database. This way, reliable optical performance data can be obtained, which does allow for reliably predicting the feasibility of certain light paths.

In addition or alternatively, the method further comprises a step of measuring performance data and storing the same in said optical performance database. By measuring the performance data, the reliability can be increased. In particular, environmental influences or aging effects on the optical performance can be reliably be accounted for.

According to a second aspect of the invention, a method for configuring a routing path comprising a source node having a transmitter, a destination node having a receiver, and one or more intermediate nodes is provided. Herein, said routing path configuring method comprises the following steps:

A) tentatively selecting one or more of the intermediate nodes for placing a 3R regenerator, thereby defining a set of tentative light paths for the routing path, said tentative light paths extending between a node selected for a 3R generator placement and one of
- another node selected for 3R generator placement,
- the source node, or
- the destination node, B) for each of said tentative light paths among said set of tentative light paths, determining the number of wavelengths meeting said predetermined feasibility criterion with regard to said tentative light path, wherein fulfillment of said feasibility criterion is indicative for the wavelength providing a predetermined optical performance level on said tentative light path, and C) calculating a second score based on the numbers of wavelengths of the tentative light paths determined in step B), said second score indicating to what extent the given tentative selection of intermediate node(s) for placing said 3R generator(s) is suitable for providing useful feasible light paths for future use, repeating steps A) to C) for a plurality of different tentative selections of intermediate node(s) for placing said 3R regenerator(s), and choosing among said tentative selections of intermediate node(s) for placing said 3R regenerator(s) the one with a second score indicating a high suitability for providing useful feasible light paths for future use.

According to this aspect, a second score is calculated based on the number wavelengths of the tentative light paths determined in step B). Namely, if it turns out that some of the tentative light paths for a tentative selection of intermediate node(s) for placing said 3R regenerator(s) have a particularly small number of feasible frequencies, such a placement is generally less favorable, because this is an indication that with this placement of 3R regenerator(s), it will be difficult to provide useful feasible light paths in the future for new services.

Note that the first and second aspects of the invention are closely related in that they both help to proactively decrease the number of 3R regenerators needed when establishing future services, and that they both are based on considering statistics of feasible frequencies to make proper choices, be it with regard to assigning a wavelength to a given light path, or selecting intermediate node(s) for placing 3R regenerator(s). In fact, the method for configuring a routing path as described in the second aspect of the invention may further comprise the steps of the method of assigning a wavelength to a given light path according to one of the embodiments described above.

In a preferred embodiment, said second score calculated in step C) corresponds to the minimum number of feasible wavelengths among any of the tentative light paths of said set of tentative light paths, and among said tentative selections of intermediate node(s) for placing said 3R generator(s) the one with a highest score is selected. The tentative light path with the lowest number of feasible wavelengths is also referred to as "critical light path" herein, because it creates a bottleneck for future service provisioning. Accordingly, light paths with few feasible frequencies should only be used when they are really needed to maintain the number of 3R regenerators at a minimum. Otherwise, 3R regenerator placements should be preferred that lead to critical light paths with higher numbers of feasible frequencies.

In a preferred embodiment, the method further comprises a step of retrieving, from a database, information about availability of wavelengths for each tentative light path among said set of tentative light paths, and in step B), the number wavelengths meeting said predetermined feasibility criterion is limited to the wavelengths found to be available.

In a preferred embodiment, one or both of said first and second scores may be computed in advance and stored for usage when routing is requested. This will allow for reducing the time needed for configuring routing a path.

According to one aspect of the invention, a computer program is provided that includes instructions which when executed on one or more processors carry out a method according to one of the embodiments summarized above. Herein, said computer program forms one of a network planning tool and a network operating tool, in particular a routing engine, or parts thereof.

According to a further aspect of the invention, a routing engine is provided as defined in the appended claims

DESCRIPTION OF THE PREFERRED EMBODIMENT

For the purposes of promoting an understanding of the principles of the invention, reference will now be made to a preferred embodiment illustrated in the drawings, and specific language will be used to describe the same. It will nevertheless be understood that no limitation of the scope of the invention is thereby intended, such alterations and further modifications in the illustrated method, routing engines and computer programs and such further applications of the principles of the invention as illustrated therein being contemplated as would normally occur now or in the future to one skilled in the art to which the invention relates.

Preferred embodiments of the invention pertain to the field of routing engines for planning and/or operating single-layer DWDM networks and multi-layer networks including a DWDM layer, and the underlying operation methods. In order to set up a service over the DWDM network, the routing engine has to decide on the resources to be allocated to the service. This implies: (1) finding a routing path between the end nodes of the service; (2) determining where to place 3R regenerators along the routing path to guarantee signal regeneration where needed; and (3) selecting a wavelength for each light path bounded by 3R regenerator sites and by the start and end nodes of the service. Note that, although not described in any detail herein, the routing engine can perform many other decisions, such as specifying add/drop ports to be utilized at the end nodes of the light paths, handling routing restrictions or conflicts, and setting up resources for failure survivability.

Figure 5:
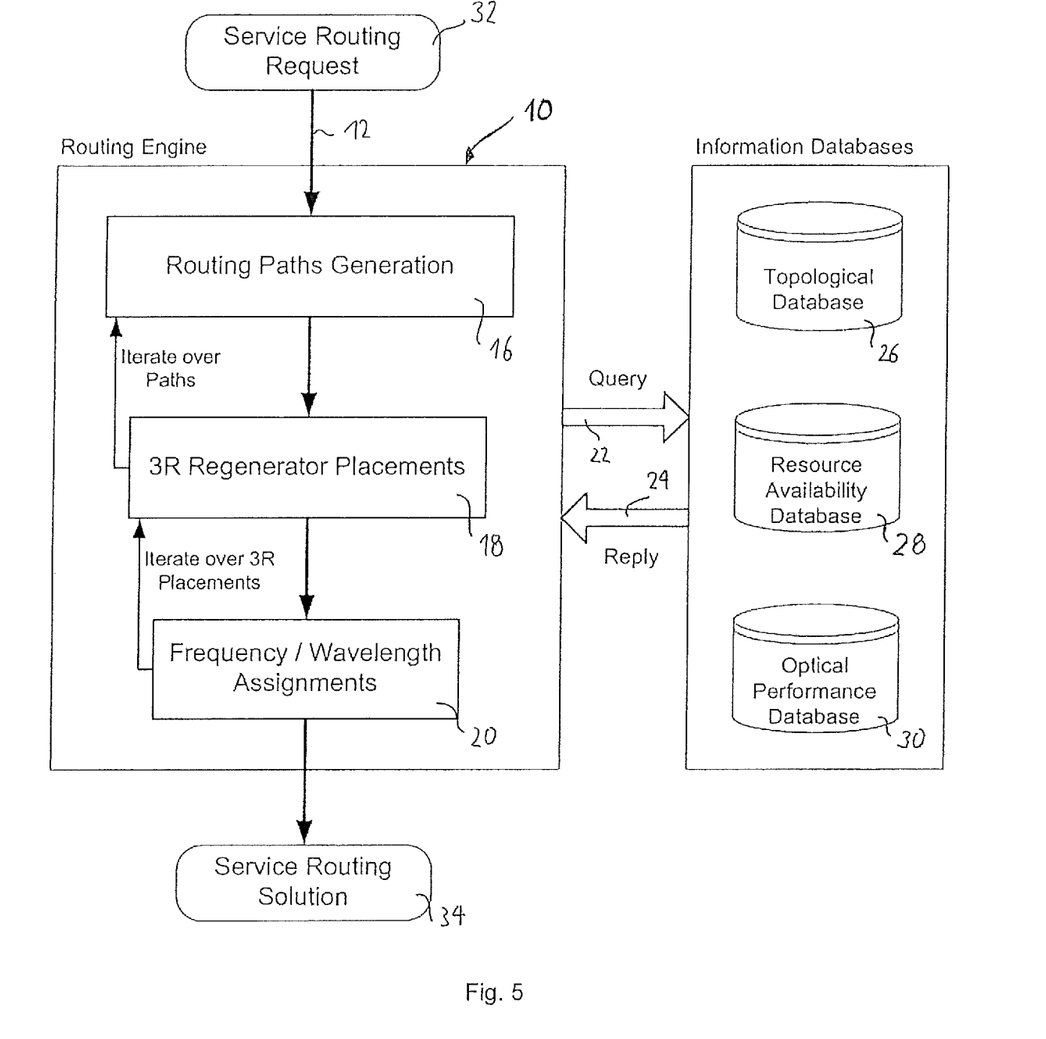
FIG. 5 is a block diagram of a routing engine that is coupled for exchange of information with information databases.

FIG. 5 shows the main building blocks of a routing engine 10 for DWDM networks. The routing engine 10 has an input interface 12 for receiving routing requests, and an output interface 14 for replying to them with a solution, which interfaces are simply represented by arrows in FIG. 5. In addition, the routing engine 10 comprises three main modules, namely a routing paths generation module 16, a 3R regenerator placement module 18, and a frequency/wavelength assignment module 20. It also has appropriate query and reply interfaces 22, 24 to databases that contain the information needed for decision making. In FIG. 5, the routing engine 10 can obtain information from a topological database 26 containing information about the network topology, from a resource availability database 28 containing information about the current availability of resources, and from an optical performance database 30 containing information about the performance enabled by the transmission technology to be used.

Also indicated in FIG. 5 is a workflow typically used by the routing engine 10 to process a service routing request 32. Firstly, the routing engine 10 creates, by means of the routing path generation module 16, one or more tentative routing paths between the start and end nodes of the service. This routing path generation is based on network topology information retrieved from the topological database 26, possibly taking into account a set of routing restrictions specified in the request, and the current resource availability inferred from the resource availability database 28.

Secondly, for each routing path, and consulting the optical performance database 30, 3R regenerator placements are analyzed by means of the 3R regenerator placement module 18, with the aim of determining the solutions that require the minimum number of 3R regenerators. Once the positions of the 3R regenerators are determined, the routing path essentially breaks up into light paths extending between a node selected for a 3R generator placement and one of
  another node selected for 3R generator placement,
  the source or start node of the service, or
  the destination or end node of the service.

Thirdly, for each light path generated as a result of enforcing a given 3R regenerator placement, the set of wavelengths is examined by means of the frequency/wavelength assignment module 20 to select one wavelength per light path such that the wavelength is both available and its optical performance enables it to bridge the light path. The latter criterion corresponds to the "feasibility" of the wavelength, which requires that the wavelength meets a predetermined feasibility criterion with regard to the given light path, which can be checked based on information from the optical performance database 30. The availability of the wavelength, on the other hand, can be discerned from the resource availability database 28.

The process carried out by the 3R regenerator placement module 18 and the frequency/wavelength assignment module 20 is referred to herein as "configuring a routing path", because it starts out from an already determined routing path, but configures the routing path with regard to the placement of 3R regenerators, and the choice of wavelengths for the corresponding light paths arising for a certain 3R regenerator placement within the routing path.

By iterating over many routing paths and 3R placements it is possible to exploit the solution search space and determine an optimized solution for the service routing request, which is then outputted as the service routing solution 34 via the output interface 14. The main criterion of optimization is usually CAPEX. Since the transmission equipment at the start and end node of the service is always needed, the optimization focuses on minimizing the amount of expensive equipment that has to be deployed for 3R regeneration.

Preferred embodiments of the present invention are related to the 3R regenerator placement stage carried out by the 3R regenerator placement module 18, and the wavelength assignment stage carried out by the frequency/wavelength assignment module 20. More specifically, preferred embodiments of the invention use two main ingredients combined to enforce an optimized management of wavelengths: a proactive performance-based frequency selection method and a proactive performance-balanced 3R placement method, each of which forming a separate aspect of the present invention, which can however be combined in a common method, computer program and routing engine, as will be described below.

Figure 6:
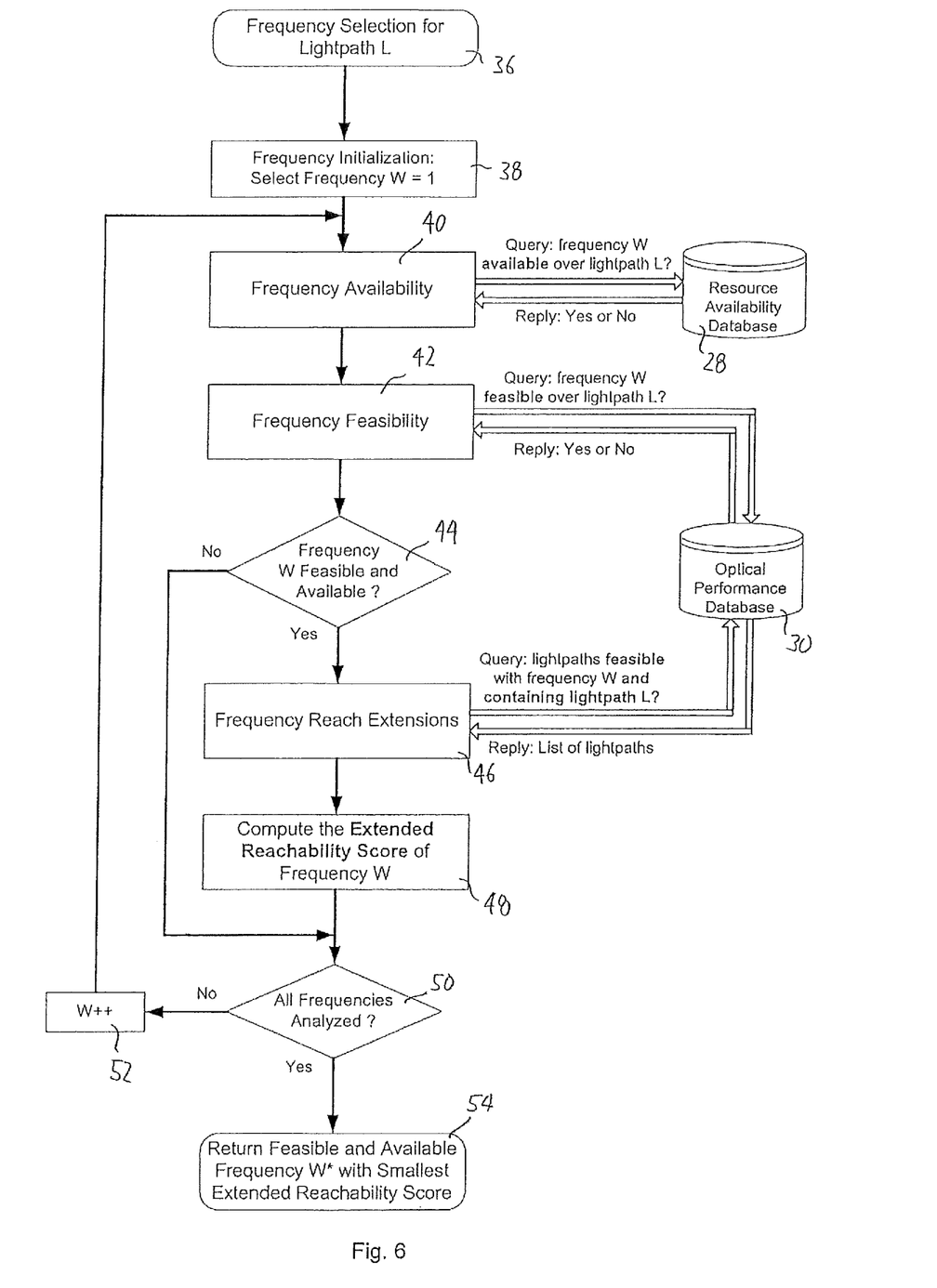
FIG. 6 is a flow diagram illustrating a method of assigning a wavelength to a given light path according to an embodiment of the invention.

The proactive performance-based frequency selection method is carried out by the frequency/wavelength assignment module 20 and used to determine the most suitable wavelength for a given light path, and the main steps thereof are shown in FIG. 6.

Upon receiving a request to select the frequency for light path L (step 36), all frequencies will be scanned for both feasibility and availability, since only frequencies that are both available in all links of L and whose performance is enough to bridge the light path can be utilized. Note that in the description of FIG. 6, reference is made to frequencies, rather than wavelengths, which is however equivalent, as the skilled person will appreciate.

More precisely, in step 38 the method starts by selecting one frequency according to some predetermined order. In step 40, it is checked with reference to the resource availability database 28 whether this given frequency is available to be used for the given light path L. Next in step 42, information is retrieved from the optical performance database 30 allowing for assessing whether the given wavelength meets a predetermined feasibility criterion with regard to the given light path, or in other words, whether the frequency is "feasible". Herein, fulfillment of the feasibility criterion is indicative for the wavelength providing a predetermined optical performance level on said given light path, where in the present embodiment, the predetermined optical performance level corresponds to a predetermined optical signal-to-noise ratio. In the embodiment shown, the optical performance database 30 has actually been populated in advance by means of a planning tool with information about which light path and frequency combinations are feasible.

In step 44, it is then checked whether the given frequency is both feasible and available. Assuming that both conditions are met, the method proceeds to step 46 in which a set of "extended feasible light paths" is determined. As was explained in the summary of the invention, an extended feasible light path is a light path which fully includes the given light path but contains at least one additional node, and which is likewise meeting the predetermined feasibility criterion. In other words, the "extended feasible light path" is an extension of the given light path L, which is likewise feasible. Stated yet differently, the extended feasible light path is a light path that includes each of the links of the given light path L, but at least one additional link. In step 46, the full set of all extended feasible light paths for the given light path L are calculated, and based on this set of extended feasible light paths, an "extended reachability score" for the given frequency/wavelength is calculated. Herein the "extended reachability score" is an example of the "first score" referred to in the summary of the invention. The extended reachability score indicates to what extent the given frequency is suitable for providing useful extended feasible light paths for future use. Specific examples for calculating such extended reachability score will be presented below.

In step 50, it is checked whether all frequencies have been analyzed. If this is not the case, the method moves on to the next frequency according to some order (step 52) and then returns to step 40. If all frequencies have been analyzed, the method proceeds to step 54 in which the feasible and available frequency is returned which has the smallest extended reachability score. Note that if in step 44 it is determined, that the given frequency is not feasible or not available, the method directly proceeds to step 50.

Next, the method steps 46 and 48 of FIG. 6 are explained in more detail. Once the set of all light paths that are extensions of light path L and are also feasible with frequency W have been determined in step 46, they are used as input to compute the extended reachability score in step 48. Simply put, this score should reflect how far this frequency can be used to create longer light paths in the network. Frequencies that enable longer light paths than others are considered to be more valuable and, therefore, they should be used as much as possible only when their extended reach makes a difference and not used unnecessarily to realize shorter light paths.

In preferred embodiments of the invention, the set of extended light paths for frequency W on light path L can be characterized by three main metrics: (1) how many they are; (2) how long they are in number of links; (3) how long they are in distance. Herein, a "metric" is a function that assigns a number to the set of feasible light paths. The extended reachability score can itself be computed based on different functions of these main metrics.

For example, assuming that the set of extended light paths for frequency W on light path L is denoted by set $E(W, L)$, where each extended light path $L' \in E(W, L)$ has $H(L')$ links more than light path L and has an extra length (compared to light path L) of $D(L')$. In preferred embodiments the extended reachability score can be obtained as:

1. $Score(W, L) = Sum\ \{1: L' \in E(W, L)\}$, that is, given by the total number of extended feasible light paths.
2. $Score(W, L) = Sum\ \{H(L'): L' \in E(W, L)\}$, that is, given by total number of additional links traversed by the extended feasible light paths.
3. $Score(W, L) = Sum\ \{D(L'): L' \in E(W, L)\}$, that is, given by total extra distance traversed by the extended feasible light paths. This score could also be modified to only reflect the total extra distance traversed by a subset of the extended feasible light paths formed by the n longest light paths among the set of extended feasible light paths, where n is a predetermined integer≥1.

The higher the score, the better is the frequency with respect to the vicinity of the current light path. In other words, a high score indicates that the given wavelength is suitable for providing useful extended feasible light paths in the vicinity of the given light path for future use. Namely, according to the score metric used, a high extended reachability score means that the frequency enables more extended light paths, more additional links traversed by the extended light paths or longer distance traversed by the extended light paths. Note that instead of using a single metric to determine the score, a combination of these metrics could be used to determine the score, that is, in general:

Score($W,L$)=function of $L' \in E(W,L), H(L')$ and $D(L')$.

A simple example of this is would be to have an extended reachability score given by the linear combination of the different metrics stated above, that is, Score($W,L$)=$A$×Sum{1:$L' \in E(W,L)$}+$B$×Sum{$H(L')$: $L' \in E(W,L)$}+$C$×Sum{$D(L'):L' \in E(W,L)$}, where A, B and C are coefficients used to determine the relevance of each metric when compared to the others. Importantly, this does not preclude any other function of these metrics (e.g., non-linear combination).

In some cases, two or more available and feasible frequencies over light path L may have exactly the same extended reachability score. Consequently, the decision can be refined by using a secondary decision criterion only for the purpose of breaking ties. Two examples for the secondary decision criteria are:

1. Decision criteria based on a predefined order of the frequencies, which can also be regarded as a preferred channel upgrade sequence. For example, there might be interest in giving preference to packing frequencies at one end of the spectrum or to fill them according to another criterion.
2. Decision criteria based on the measured or expected performance (e.g., OSNR) of each frequency over the light path L. This could be used, for instance, to give preference to the frequencies with lowest score that have slightly better performance (but not good enough to enable longer light paths). As an example, this approach could be used to guarantee a slightly higher performance margin to cope with performance degradation from ageing or other effects.

After analyzing all the frequencies, the method returns in step 54 the feasible and available frequency W* that has the smallest extended reachability score (using the secondary decision criterion to break ties, if one exists). This is the most suitable frequency given the current state of the network since it corresponds to one of the "worst performing" frequencies that can still be used to realize the light path. Hence, "better performing" frequencies are spared for the upcoming services, which may need to rely on one of the longer light paths enabled by these frequencies to keep the number of 3R regenerators at a minimum value.

Importantly, the process of determining the score is firstly based on the tangible improvements of reach each frequency can provide around the current light path rather than on general frequency performance statistics, which would not include any local information and will in many cases lead to a different and less effective decision.

Figure 7:
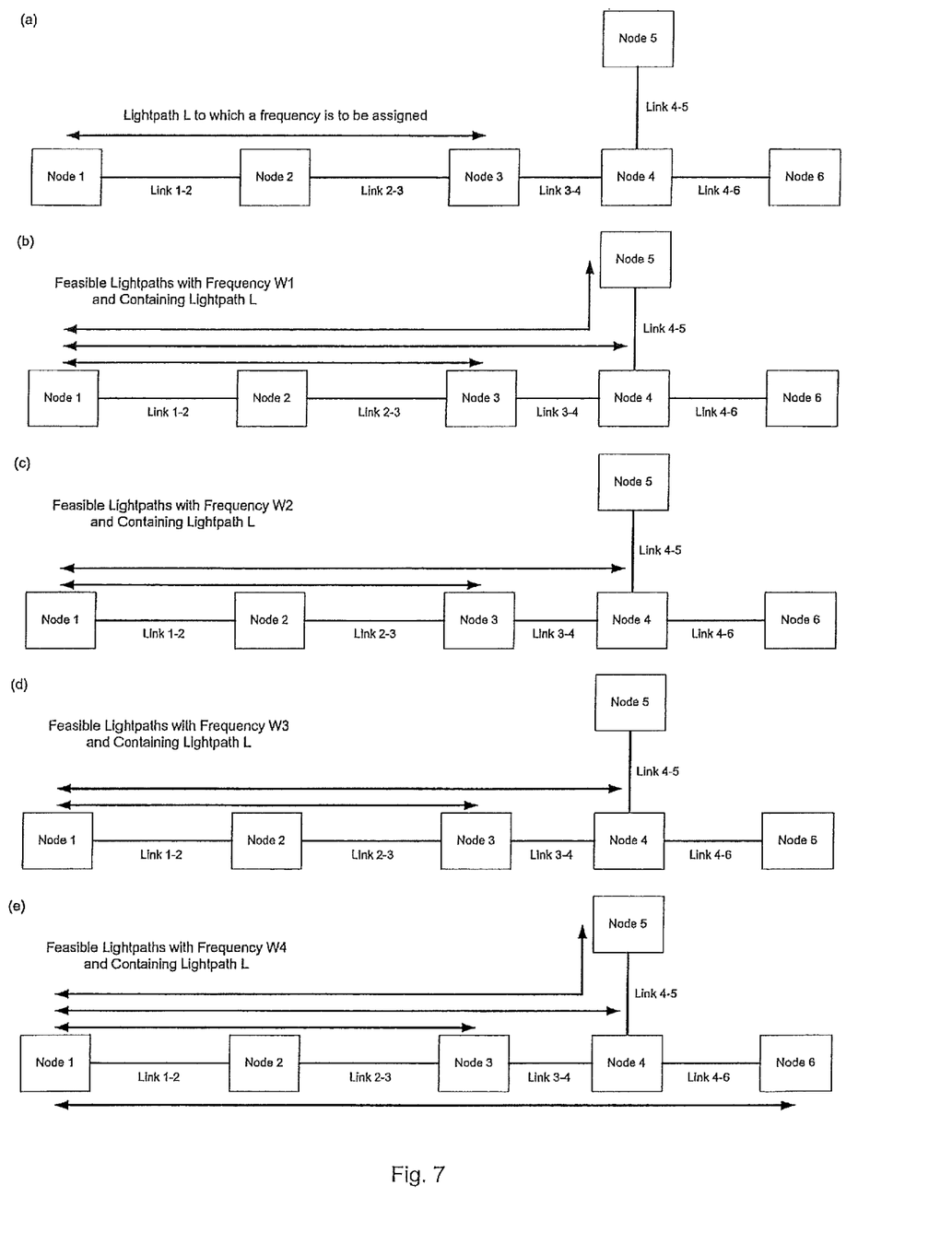
FIG. 7 illustrates examples of proactive performance-based frequency selection.

An example of the extended reachability score calculation is depicted in FIG. 7. In this case, a light path L is to be set up between nodes 1 and 3. After determining which frequencies are both available and feasible over light path L, it is assumed that only 4 frequencies meet both criteria. These frequencies are designated as W1, W2, W3 and W4. For each of these frequencies the routing engine 10 will query the optical performance database 30 in step 46 of FIG. 6 to determine the set of light paths containing light path L and which are feasible with that frequency (extended feasible light paths).

As a result of the reply to the query, the routing engine 10 knows that for frequency W1 there are two extended light paths containing light path L (ignoring light path L itself), whereas for frequencies W2 and W3 that number is one and for frequency W4 there are three extended feasible light paths. Using one of the described preferred embodiments to compute the extended reachability score, more precisely the one where the score is given by the total number of additional links traversed by the extended light paths, this results in having Score(W1, L)=2, Score(W2, L)=1, Score(W3, L)=1, Score(W4, L)=3. Therefore, the frequency that enables the largest extension to light path L is W4, followed by W1. Both W2 and W3 can only provide a more modest extension and are, consequently, the most suitable ones to be assigned to light path L.

Importantly, since more than one frequency attains the same extended reachability score, one secondary decision criterion can be used to break ties. For example, the routing engine 10 can give preference to assigning the frequency with lowest index (in this case W2). This preserves some ability to still pack frequencies on one side of the spectrum when more than one frequency has the minimum extended reachability score.

Figure 8:
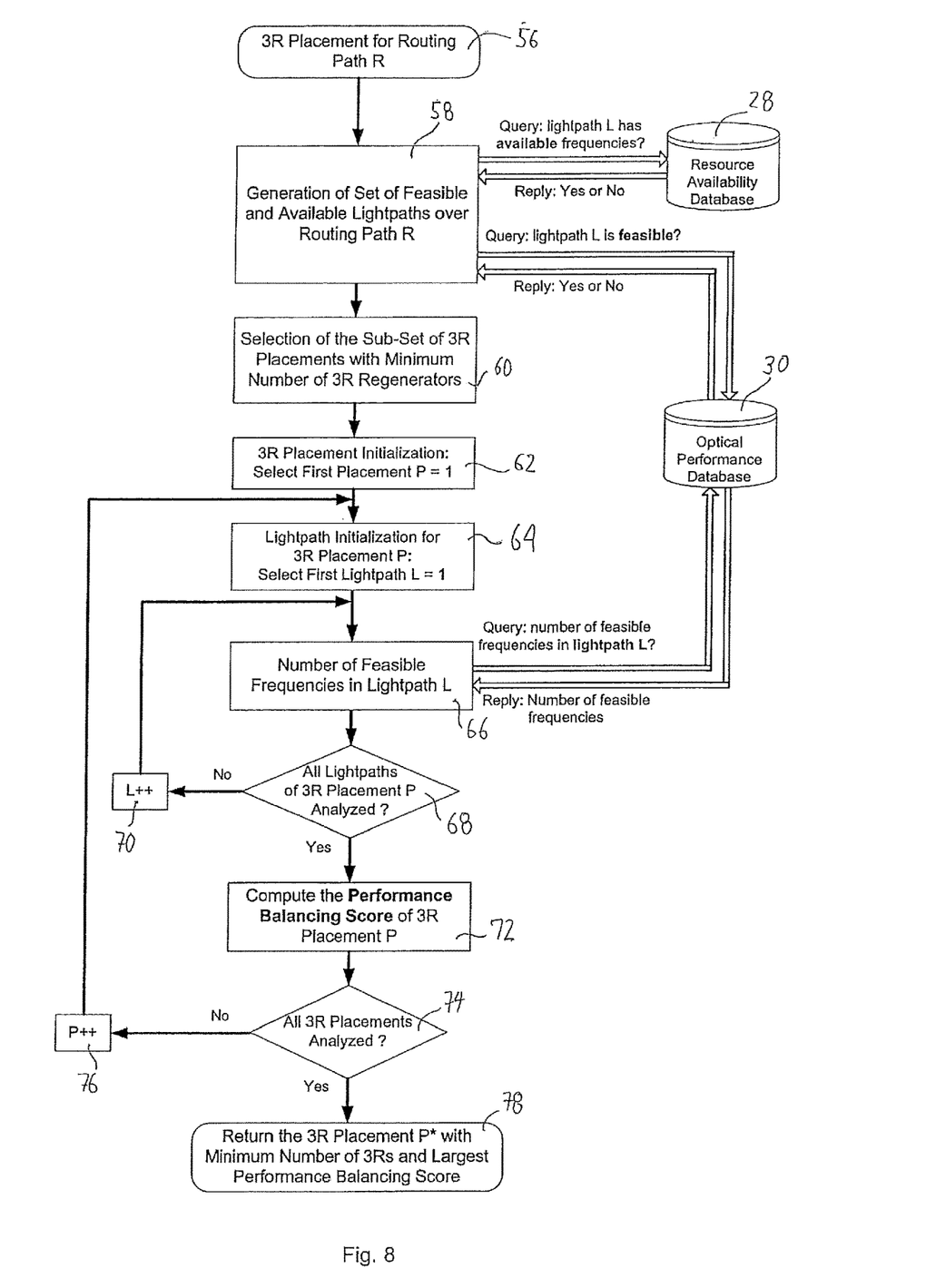
FIG. 8 is a flow diagram illustrating a method for proactive performance balanced 3R placement selection.

According to various embodiments of the invention, the proactive performance-based frequency selection method described above is complemented by a new proactive performance-balanced 3R placement method. This method is utilized to determine for a given routing path R the most suitable 3R placement, while taking into account also the frequency-dependency of optical performance. This method is carried out by the 3R regenerator placement module 18 shown in FIG. 5 and is illustrated in FIG. 8.

Upon receiving a request to determine the 3R placement for routing path R (step 56), for example from the routing path generation module 16 of FIG. 5, in step 58 the set of all 3R placements over this routing path whose light paths have at least one feasible and available frequency is created. This involves queries to the resource availability database 28 and to the optical performance database 30, as indicated in FIG. 8.

In step 60, this set is filtered in order to keep only the 3R placements with the minimum number of 3R regenerators, i.e., with minimum number of light paths (note that if a given 3R placement requires N 3R regenerators, it will comprise N+1 light paths). The reason for this is that in the framework of the present invention, the main objective when planning/operating particularly a long-haul DWDM network is typically to minimize the number of 3R regenerators deployed/used.

In step 62, a first 3R placement is selected according to some predetermined order. Note that an "3R placement" means that for a given routing path, a tentative selection of the intermediate nodes for placing a 3R regenerator is made, thereby likewise defining a set of tentative light paths for the routing path, wherein the tentative light paths extend between a node selected for a 3R generator placement and one of
  another node selected for 3R regenerator placement,
  the source node, or
  the destination node.

The selections are only "tentative" because they would be possible choices, but it still needs to be determined whether they actually amount to the best choice.

Next, in step 64, a first light path among said tentative light paths is selected according to some order. In step 66, it is retrieved from the optical performance database 30 how many feasible frequencies exist for this tentative light path. Optionally, while not shown in FIG. 8, a query to the resource availability database 28 could be made to also account for how many of the frequencies are not only feasible but also available. In step 68, it is checked whether all tentative light paths for the given 3R regenerator placement have been considered. If this is not the case, the method moves on to the next tentative light paths according to some order (step 70) and returns to step 66.

The described process is hence applied for all (tentative) light paths of the (tentative) 3R placement under analysis. Once this task has been completed, in step 72, the (tentative) 3R placement is given a performance balancing score, which is a function of the number of feasible frequencies in the light paths of the 3R placement. After the calculation of the performance balancing score in step 72, it is checked in step 74 whether all 3R placements have been analyzed. If this is not the case, the next 3R placement according to some order is chosen (step 76), and the method returns to step 64. In the alternative, the method terminates at step 78 by returning the 3R placement P* with the minimum number of 3R's and the largest performance balancing score.

The performance balancing score computed in step 72 is an example of the "second score" referred to in the summary of the invention, which indicates to what extent the given tentative selection of intermediate nodes for placing said 3R regenerators is suitable for providing useful feasible light paths for future use. In general, this score should reflect how likely it is to find feasible (and optionally available) frequencies to establish the service using this specific 3R placement. Light paths with fewer feasible frequencies are considered more valuable and, therefore, should be used as much as possible only when there are no other 3R placements with minimum number of 3R regenerators that rely on light paths with larger number of feasible frequencies.

For example, let $P_{min}(R)$ denote the set of 3R placements over routing path R with minimum number of 3R regenerators, and consider the current 3R placement $P \in P_{min}(R)$, which comprises a set of light paths $L \in P$. The number of feasible frequencies over each light path L of 3R placement P is denoted as $\# W(L, P)$. In a preferred embodiment the performance balancing score of 3R placement P can be obtained simply by computing:

$$\text{Score}(P) = \{\text{Min}\{\#W(L,P):L \in P\}: P \in P_{min}(R).$$

In other words, for each of said tentative light paths L belonging to a tentative 3R placement P, the number $\# W(L, P)$ of feasible wavelengths is determined, and among these, the smallest number is selected. The corresponding light path L for which $\# W(L, P)$ is minimum is referred to as the "critical light path", because it is the light path with the fewest feasible frequencies. This critical light path is identified, and its number of feasible frequencies is used as a score for deciding on which 3R placement is the best. More precisely, the 3R placement P* whose critical light path has a larger number of feasible frequencies is given preference over the remaining ones. With this approach the light paths that have fewer feasible frequencies are only used when they are really needed to maintain the number of 3R regenerators at a minimum. Combined with the proactive performance-based frequency selection method described above, this grants the routing engine 10 the ability to preserve as much as possible both the critical light paths and best performing frequencies for the most demanding services.

Figure 9:
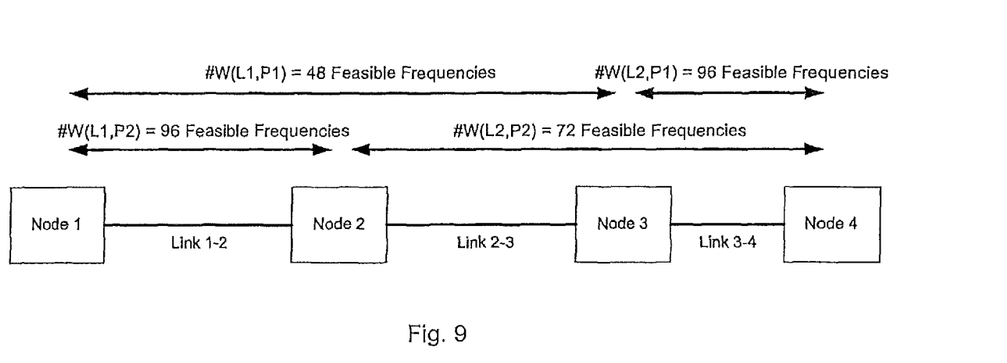
FIG. 9 illustrates an example of the proactive performance-based frequency selection.

An example of the performance balancing score is depicted in FIG. 9. In this case, there are two 3R placements over a routing path between nodes 1 and 4 that require the minimum number of regenerators (only one 3R regenerator). 3R placement P1 can be realized with two light paths which have 48 and 96 feasible frequencies (with the 3R regenerator provided at node 3), whereas 3R placement P2 can be realized with two other light paths which have 96 and 72 feasible frequencies (and with the 3R regenerator located at node 2). Consequently, the performance balancing scores are: Score(P1)=48 and Score(P2)=72. Since the critical light path of 3R placement P2 has more feasible frequencies, this 3R placement should be selected in case a service is to be established between nodes 1 and 4.

As explained above, embodiments of the present invention are applicable to both network planning and network operation. With respect to DWDM and multi-layer (including the DWDM layer) network planning, various embodiments of the invention can be implemented as a computer program or part of a computer program where routing requests are received, processed and replied to. For example, it could be implemented in already existing network planning tools, assuming all required information to execute the invention is available within these tools.

With respect to DWDM and multi-layer (including the DWDM layer) network operation, the invention can be implemented as a set of additional decisions within the routing engine 10 of the network operation platform, such as SDN, TNMS, or GMPLS, which is assumed to be executed in a Path Computation Element (PCE), and a set of additional queries to/replies from the optical performance database, which is located in either a standalone or in an existing Traffic Engineering Database (TED).

An alternative implementation of the invention is to compute the extended reachability score and the performance balancing score offline in advance and store it for usage (instead of computing it on-the-fly). This could reduce computation time at runtime, which can be relevant in network operation scenarios, but at the expense of maintaining more information in a database.

In order to illustrate the benefits of adopting the proposed invention, two long-haul customer networks were planned using different methods for frequency assignment. The first network spans through the United States and comprises almost 100 ROADMs, whereas the second network is a Pan-European one containing around 50 ROADMs. The number of 100 G services to be established over these networks is 1300 and 379, respectively. Both networks have been designed in Coriant's TransNet planning tool, wherein frequency dependent performance information to populate the database has also been computed with this DWDM planning tool.

An implementation of a routing engine was extended for the case of having access to the database with per frequency optical performance and to support four main methods to realize 3R placement and frequency assignment. All simulations can exploit exactly the same set of routing paths. Moreover, the 3R placement that leads to the least number of 3R regenerators is determined in each call to the routing engine to route a service. This ensures that any difference in the number of 3R regenerators required will necessarily be due to the different 3R placement and frequency assignment. The first method employs an embodiment of the present invention, which uses the proactive performance-based frequency assignment and the proactive performance-balanced 3R placement, the second consists of using the Channel Plan as defined in TransNet, the third gives preference to packing light paths on the lower frequencies (i.e., First Fit extended for a scenario with frequency dependent performance) and the fourth gives preference to packing light paths on the higher frequencies (i.e., Last Fit extended for a scenario with frequency dependent performance).

Table II shows the number of 3R regenerators that need to be deployed to establish all services when each of the methods is used. As can be seen, the lowest number of 3R regenerators was obtained using the embodiment of the invention in both networks. The remaining three methods require between 3 and 42 more 3R regenerators. The relative increase in 3R count when using these methods instead of the invention ranges from 2.1% to 11.5%. Note that the 3R regenerators in these networks will account for a very significant share of the network CAPEX, so any savings in their number is of utmost relevance. These results clearly highlight that embodiments of the invention enable better tender planning and/or network operation of long-haul DWDM networks.

TABLE II

Number of 3R regenerators required when planning two customer networks.

| Network | # 100 G Services | Invention | # 3Rs Required with each Method (additional 3Rs, additional fraction of 3Rs) | | |
|---|---|---|---|---|---|
| | | | Channel Plan | Low Frequencies First | High Frequencies First |
| US Long-haul Network | 1300 | 565 | 584 (+19, +3.4%) | 607 (+42, +7.4%) | 577 (+12, +2.1%) |
| EU Long-haul Network | 379 | 87 | 90 (+3, +3.4%) | 97 (+10, +11.5%) | 92 (+5, +5.7%) |

Although a preferred exemplary embodiment is shown and specified in detail in the drawings and the preceding specification, these should be viewed as purely exemplary and not as limiting the invention. It is noted in this regard that only the preferred exemplary embodiment is shown and specified, and all variations and modifications should be protected that presently or in the future lie within the scope of protection of the invention as defined in the claims.

REFERENCE SIGNS 10 routing engine
12 input interface
14 output interface
16 routing paths generation module
18 3R regenerator placement module
20 frequency/wavelength assignment module
22 query interface
24 reply interface
26 topological database
28 resource availability database
30 optical performance database
32 service routing request
34 service routing solution
36 to 54 steps in method for assigning a wavelength to a given light path
56 to 78 steps in method for determining a 3R placement in a routing path

The invention claimed is:
1. A method of assigning a wavelength to a light path in a wavelength-switched optical network, the light path comprising at least a first link intermediate a first node and a second node, the method comprising the steps of:
retrieving information from an optical performance database;
determining, with respect to the light path and based at least in part on the information retrieved from the optical performance database, which wavelengths, among a first plurality of wavelengths, meet at least one predetermined criterion relating to a predetermined level of optical performance on the light path;
for each respective wavelength among at least a second plurality of wavelengths among the wavelengths that meet the at least one predetermined criterion with respect to the light path:
identifying, with reference to the retrieved information, a respective set of extended light paths for the respective wavelength, the respective set of extended light paths comprising at least one extended light path, for the respective wavelength, with respect to the at least one extended light path the respective wavelength also meets the at least one predetermined criterion, wherein each extended light path of the respective set of extended light paths for the respective wavelength comprises the light path as further extended by a respective extension of the light path to at least one other respective point in the wavelength-switched optical network to which the light path does not extend in an absence of the respective extension;
developing a respective score for the respective wavelength based at least in part on the respective set of extended light paths for the respective wavelength that results from the identifying step, wherein a plurality of metrics are employed in developing the respective score for the respective wavelength, the plurality of metrics comprising at least two of:
a first metric representative of a total number of extended light paths within the respective set of extended light paths for the respective wavelength,
a second metric representative of a total number of additional links traversed by extended light paths within the respective set of extended light paths for the respective wavelength,
a third metric representative of a total additional length of all extended light paths within the respective set of extended light paths for the respective wavelength,
a fourth metric representative of a total additional length of a subset of extended light paths within the respective set of extended light paths for the respective wavelength, wherein the subset identified relative to the respective wavelength comprises one or more extended light paths that are longest among the respective set of extended light paths for the respective wavelength;

selecting, for assignment to the light path, a wavelength among the second plurality of wavelengths, wherein the step of selecting selects a wavelength based at least in part on an analysis of the respective scores for the second plurality of wavelengths.

2. The method of claim 1, wherein the wavelength selected in the selecting step is a wavelength having a lowest score among the respective scores of all wavelengths of the second plurality of wavelengths.

3. The method of claim 1, wherein in at least one circumstance in which the respective score developed for a first wavelength among the second plurality of wavelengths is equal to the respective score developed for at least a second wavelength among the second plurality of wavelengths, the selecting step further comprises selecting between the first wavelength and the second wavelength based at least in part on at least one of:
a predefined order of wavelengths;
a first level of optical performance on the light path that corresponds with one of the first wavelength and the second wavelength, relative to a second level of optical performance on the light path that corresponds with the other of the first wavelength and the second wavelength, wherein the first level of optical performance on the light path differs from the second level of optical performance on the light path.

4. The method of claim 1, further comprising a step of retrieving, from a database, information about availability of wavelengths for the light path, and wherein the first plurality of wavelengths corresponds to a set of wavelengths that have been confirmed to be available.

5. The method of claim 1, wherein the predetermined level of optical performance relates at least in part to an optical signal-to-noise ratio.

6. The method of claim 1, wherein the method is carried out by a routing engine configured to at least contribute to at least one of:
a planning of a wavelength-switched optical network;
an operation of a wavelength-switched optical network.

7. The method of claim 1, further comprising the steps of:
estimating optical performance data based on at least one of the following characteristics:
length of a corresponding link;
link loading;
information regarding a fiber type;
launch power;
dispersion information; and
storing the estimated optical performance data in the optical performance database.

8. The method of claim 1, further comprising the steps of:
measuring optical performance data; and
storing the measured optical performance data in the optical performance database.

9. A non-transitory computer readable medium having computer-readable instructions stored thereon that, when executed by one or more processors, generate control signals for carrying out a method of wavelength selection for a light path in a wavelength-switched optical network, the light path comprising at least a first link intermediate a first node and a second node, the method comprising the steps of:

retrieving information from an optical performance database;

determining, with respect to the light path and with reference to the retrieved information, which wavelengths, among a first plurality of wavelengths, meet at least one criterion to be met in providing a particular optical performance level on the light path;

for each respective wavelength among at least a second plurality of wavelengths among the wavelengths that meet the at least one criterion with respect to the light path:
identifying, with reference to the retrieved information, a respective set of extended light paths for the respective wavelength, the respective set of extended light paths comprising at least one extended light path, for the respective wavelength, with respect to the at least one extended light path the respective wavelength also meets the at least one criterion, wherein each respective extended light path of the respective set of extended light paths for the respective wavelength comprises the light path as further extended by a respective extension of the light path to at least one other respective point in the wavelength-switched optical network to which the light path does not extend in an absence of the respective extension;

developing a respective score for the respective wavelength based at least in part on the respective set of extended light paths for the respective wavelength that results from the identifying step, wherein a plurality of metrics are employed in developing the respective score for the respective wavelength, the plurality of metrics comprising at least two of:
a first metric representative of a total number of extended light paths within the respective set of extended light paths for the respective wavelength,
a second metric representative of a total number of additional links traversed by extended light paths within the respective set of extended light paths for the respective wavelength,
a third metric representative of a total additional length of all extended light paths within the respective set of extended light paths for the respective wavelength,
a fourth metric representative of a total additional length of a subset of extended light paths within the respective set of extended light paths for the respective wavelength, wherein the subset identified relative to the respective wavelength comprises one or more extended light paths that are longest among the respective set of extended light paths for the respective wavelength;

selecting, for assignment to the light path, a wavelength among the second plurality of wavelengths, wherein the step of selecting selects a wavelength based at least in part on an analysis of the respective scores for the second plurality of wavelengths.

10. The non-transitory computer readable medium having computer-readable instructions stored thereon of claim 9, wherein the method is carried out at least in part by at least one of a network planning tool and a network operating tool, and wherein the wavelength selected in the selecting step is a wavelength for which a lowest score is determined among the second plurality of wavelengths.

11. A routing engine comprising a module and an interface through which the routing engine is configured to request and receive information from an optical performance database, wherein the module is configured to assign a wavelength to a light path in a wavelength-switched optical network by carrying out the steps of:

retrieving information from the optical performance database;

determining, with respect to the light path and based at least in part on the information retrieved from the optical performance database, which wavelengths, among a first plurality of wavelengths, meet at least one criterion to be met in providing a particular optical performance level on light path;

for each respective wavelength among at least a second plurality of wavelengths among the wavelengths that meet the at least one criterion with respect to the light path:

identifying, with reference to the retrieved information, a respective set of extended light paths for the respective wavelength, the respective set of extended light paths comprising at least one extended light path, for the respective wavelength, with respect to the at least one extended light path the respective wavelength also meets the at least one criterion, wherein each extended light path of the respective set of extended light paths for the respective wavelength comprises the light path as further extended by a respective extension of the light path to at least one other respective point in the wavelength-switched optical network to which the light path does not extend in an absence of the respective extension;

developing a respective score for the respective wavelength based at least in part on the respective set of extended light paths for the respective wavelength that results from the identifying step, wherein a plurality of metrics are employed in developing the respective score for the respective wavelength, the plurality of metrics comprising at least two of:

a first metric representative of a total number of extended light paths within the respective set of extended light paths for the respective wavelength, a second metric representative of a total number of additional links traversed by extended light paths within the respective set of extended light paths for the respective wavelength, a third metric representative of a total additional length of all extended light paths within the respective set of extended light paths for the respective wavelength, a fourth metric representative of a total additional length of a subset of extended light paths within the respective set of extended light paths for the respective wavelength, wherein the subset identified relative to the respective wavelength comprises one or more extended light paths that are longest among the respective set of extended light paths for the respective wavelength;

selecting, for assignment to the light path, a wavelength among the second plurality of wavelengths, wherein the step of selecting selects a wavelength based at least in part on an analysis of the respective scores for the second plurality of wavelengths.

* * * * *